US010044438B2

United States Patent
Kadous et al.

(10) Patent No.: US 10,044,438 B2
(45) Date of Patent: Aug. 7, 2018

(54) CARRIER SENSE ADAPTIVE TRANSMISSION (CSAT) MEASUREMENTS IN SHARED SPECTRUM

(71) Applicant: QUALCOMM Incorporated, San Diego, CA (US)

(72) Inventors: Tamer Adel Kadous, San Diego, CA (US); Ahmed Kamel Sadek, San Diego, CA (US); Tingfang Ji, San Diego, CA (US); Mingxi Fan, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 440 days.

(21) Appl. No.: 14/620,377

(22) Filed: Feb. 12, 2015

(65) Prior Publication Data

US 2015/0236782 A1 Aug. 20, 2015

Related U.S. Application Data

(60) Provisional application No. 61/940,595, filed on Feb. 17, 2014, provisional application No. 61/978,701, filed on Apr. 11, 2014.

(51) Int. Cl.
*H04B 7/26* (2006.01)
*H04W 16/14* (2009.01)
(Continued)

(52) U.S. Cl.
CPC .......... *H04B 7/2643* (2013.01); *H04W 16/14* (2013.01); *H04W 24/10* (2013.01);
(Continued)

(58) Field of Classification Search
None
See application file for complete search history.

(56) References Cited

U.S. PATENT DOCUMENTS 5,999,818 A * 12/1999 Gilbert ................. H04W 16/00
370/330
8,923,208 B2 12/2014 Dayal et al.
(Continued)

FOREIGN PATENT DOCUMENTS

WO     2012093349 A2    7/2012
WO     2013006988 A1    1/2013

OTHER PUBLICATIONS

International Search Report and Written Opinion—PCT/US2015/015903—ISA/EPO—dated Sep. 9, 2015.
(Continued)

*Primary Examiner* — Ayaz Sheikh
*Assistant Examiner* — Sori Aga
(74) *Attorney, Agent, or Firm* — Muncy, Geissler, Olds & Lowe, P.C./Qualcomm

(57) ABSTRACT

Techniques for managing operation on a communication medium shared between Radio Access Technologies (RATs) are disclosed. The management may comprise, for example, monitoring the medium for first RAT signaling in accordance with a first RAT; determining a utilization metric associated with utilization of the medium by the first RAT signaling; cycling operation in accordance with a second RAT between activated periods and deactivated periods of communication over the medium in accordance with a Time Division Multiple Access (TDM) communication pattern based on the utilization metric; and periodically disabling the cycling to provide an AOS period of activated communication over the medium for operation in accordance with the second RAT, with the AOS period being longer than an individual activated period of the TDM communication pattern. The management may also comprise, for example, techniques for enabling/disabling monitoring by an access (Continued)

terminal in accordance with the TDM communication pattern.

21 Claims, 15 Drawing Sheets

(51) Int. Cl.
  *H04W 74/04* (2009.01)
  *H04W 72/12* (2009.01)
  *H04W 24/10* (2009.01)
  *H04W 84/12* (2009.01)
  *H04W 88/10* (2009.01)
  *H04W 84/04* (2009.01)

(52) U.S. Cl.
  CPC ....... *H04W 72/1215* (2013.01); *H04W 74/04* (2013.01); *H04W 84/045* (2013.01); *H04W 84/12* (2013.01); *H04W 88/10* (2013.01)

(56) References Cited

U.S. PATENT DOCUMENTS

| | | | |
|---|---|---|---|
| 2012/0094681 A1* | 4/2012 | Freda | H04W 72/02 455/452.1 |
| 2012/0213162 A1 | 8/2012 | Koo et al. | |
| 2013/0083661 A1* | 4/2013 | Gupta | H04W 28/0215 370/235 |
| 2013/0201884 A1 | 8/2013 | Freda et al. | |
| 2013/0208587 A1 | 8/2013 | Bala et al. | |
| 2013/0315152 A1 | 11/2013 | Ratasuk et al. | |
| 2014/0140314 A1 | 5/2014 | Wei et al. | |
| 2014/0378157 A1* | 12/2014 | Wei | H04W 16/14 455/454 |

OTHER PUBLICATIONS

Partial International Search Report—PCT/US2015/015903—ISA/EPO—dated Jun. 12, 2015.

3GPP TS 36.321 V12.0.0: "3rd Generation Partnership Project; Technical Specification Group Radio Access Network, Evolved Universal Terrestrial Radio Access (E-UTRA), Medium Access Control (MAC) protocol specification (Release 12)", 3rd Generation Partnership Project (3GPP), Mobile Competence Centre, 650, Route Des Lucioles, F-06921 Sophia Antipolis Cedex, France, vol. RAN WG2, No. V12.0.0, Jan. 6, 2014 (Jan. 6, 2014), pp. 1-57, XP050729377, [retrieved on Jan. 6, 2014].

* cited by examiner

CARRIER SENSE ADAPTIVE TRANSMISSION (CSAT) MEASUREMENTS IN SHARED SPECTRUM

CROSS-REFERENCE TO RELATED APPLICATIONS

The present application for patent claims the benefit of U.S. Provisional Application No. 61/940,595, entitled "CARRIER SENSE ADAPTIVE TRANSMISSION (CSAT) ALWAYS-ON-STATE (AOS) IN UNLICENSED SPECTRUM," filed Feb. 17, 2014, and U.S. Provisional Application No. 61/978,701, entitled "CARRIER SENSE ADAPTIVE TRANSMISSION (CSAT) INTRA AND INTER FREQUENCY MEASUREMENTS IN UNLICENSED SPECTRUM," filed Apr. 11, 2014, each assigned to the assignee hereof, and each expressly incorporated herein by reference in its entirety.

INTRODUCTION

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency band such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for adaptive transmission and related operations in shared spectrum are disclosed.

In one example, an apparatus for managing operation on a communication medium shared between Radio Access Technologies (RATs) is disclosed. The apparatus may include, for example, a first transceiver, a medium utilization analyzer, a second transceiver, and an Always-On-State (AOS) controller. The first transceiver may be configured to operate in accordance with a first RAT and to monitor the medium for first RAT signaling. The medium utilization analyzer may be configured to determine a utilization metric associated with utilization of the medium by the first RAT signaling. The second transceiver may be configured to operate in accordance with a second RAT and to cycle between activated periods and deactivated periods of communication over the medium in accordance with a Time Division Multiplexing (TDM) communication pattern based on the utilization metric. The AOS controller may be configured to periodically disable the cycling to provide an AOS period of activated communication over the medium for the second transceiver, with the AOS period being longer than an individual activated period of the TDM communication pattern.

In another example, a method of managing operation on a communication medium shared between RATs is disclosed. The method may comprise, for example, monitoring the medium for first RAT signaling in accordance with a first RAT; determining a utilization metric associated with utilization of the medium by the first RAT signaling; cycling operation in accordance with a second RAT between activated periods and deactivated periods of communication over the medium in accordance with a TDM communication pattern based on the utilization metric; and periodically disabling the cycling to provide an AOS period of activated communication over the medium for operation in accordance with the second RAT, with the AOS period being longer than an individual activated period of the TDM communication pattern.

In another example, another apparatus for managing operation on a communication medium shared between RATs is disclosed. The apparatus may comprise, for example, a transceiver and a measurement controller. The transceiver may be configured to receive an activation command configuring the apparatus for activated operation over the medium on a first frequency in accordance with an activated period of a TDM communication pattern defining activated periods and deactivated periods of communication over the medium. The measurement controller may be configured to enable monitoring of signaling on the first frequency or a second frequency during the activated period. The transceiver may be further configured to receive a deactivation command de-configuring the apparatus from activated operation on the first frequency in accordance with a deactivated period of the TDM communication pattern. The measurement controller may be further configured to disable monitoring by the apparatus of the signaling on the first frequency or the second frequency during the deactivated period.

In another example, another method for managing operation on a communication medium shared between RATs is disclosed. The method may comprise, for example, receiving an activation command configuring an access terminal for activated operation over the medium on a first frequency in accordance with an activated period of a TDM communication pattern defining activated periods and deactivated periods of communication over the medium; enabling monitoring by the access terminal of signaling on the first frequency or a second frequency during the activated period; receiving a deactivation command de-configuring the access terminal from activated operation on the first frequency in accordance with a deactivated period of the TDM communication pattern; and disabling monitoring by the access terminal of the signaling on the first frequency or the second frequency during the deactivated period.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to an example long-term Time Division Multiplexed (TDM) communication scheme referred to herein as Carrier Sense Adaptive Transmission (CSAT). A CSAT communication scheme may define a series of activated and deactivated periods of operation on a given communication medium. In addition, as described in more detail below, an Always-On-State (AOS) period may be periodically provided on top of the CSAT communication scheme to provide supplemental measurement opportunities (e.g., by temporarily disabling the cycling between activated and deactivated periods). Access terminals performing the measurements may also be configured to refrain from doing so during the deactivated periods.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
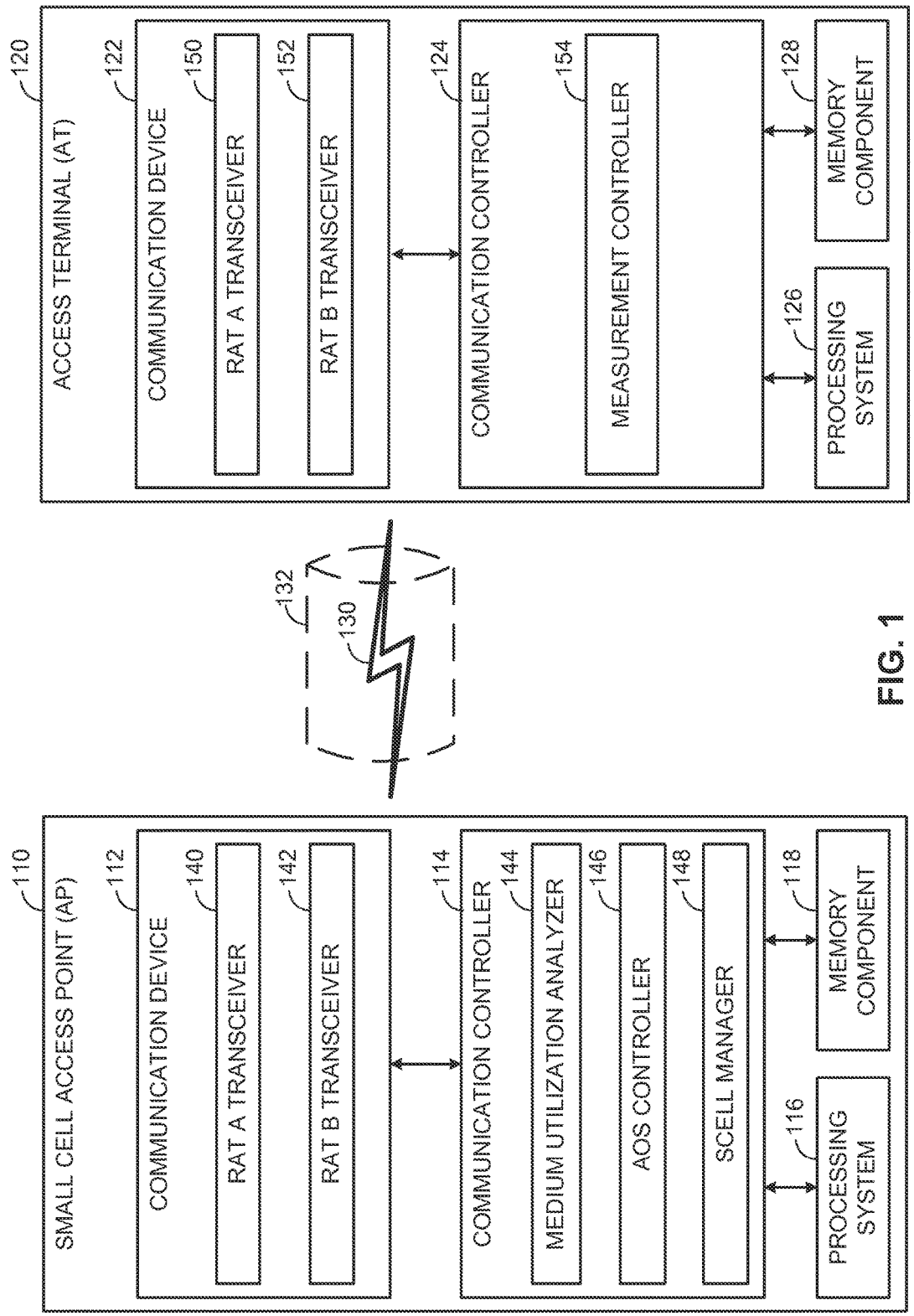
FIG. 1 illustrates an example wireless communication system including a Small Cell Access Point (AP) in communication with an Access Terminal (AT).

FIG. 1 illustrates an example wireless communication system including a Small Cell Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (JOT)/Internet of Everything (JOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc. "Small cells" generally refer to a class of low-powered access points that may include or be otherwise referred to as femto cells, pico cells, micro cells, Wi-Fi APs, other small coverage area APs, etc. Small cells may be deployed to supplement macro cell coverage, which may cover a few blocks within a neighborhood or several square miles in a rural environment, thereby leading to improved signaling, incremental capacity growth, richer user experience, and so on.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128).

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

The access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points as in the system of FIG. 1, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes two "co-located" transceivers operating according to respective RATs, including a "RAT A" transceiver 140 and a "RAT B" transceiver 142. As used herein, a transceiver may include a transmitter circuit, a receiver circuit, or a combination thereof, but need not provide both functionalities in all designs. For example, a low functionality receiver circuit may be employed in some designs to reduce costs when providing full communication is not necessary (e.g., a Wi-Fi chip or similar circuitry simply providing low-level sniffing). Further, as used herein, the term co-located (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The RAT A transceiver 140 and the RAT B transceiver 142 may provide different functionalities and may be used for different purposes. As an example, the RAT A transceiver 140 may operate in accordance with Long Term Evolution (LTE) technology to provide communication with the access terminal 120 on the wireless link 130, while the RAT B transceiver 142 may operate in accordance with Wi-Fi technology to monitor Wi-Fi signaling on the medium 132 that may interfere with or be interfered with by the LTE communications. Further, the communication device 122 of the access terminal 120 is shown in FIG. 1 as including a similar RAT A transceiver 150 and a similar RAT B transceiver 152 for illustration purposes, although it may not be necessary for both the access point 110 and the access terminal 120 to be multi-RAT capable in all designs.

As will be discussed in more detail below with reference to FIGS. 2-7, the communication controller 114 of the access point 110 may include a medium utilization analyzer 144, an Always-On-State (AOS) controller 146, and a Secondary Cell (SCell) manager 148, which may operate in conjunction with the RAT A transceiver 140 and the RAT B transceiver 142 to manage operation on the medium 132.

Figure 2:
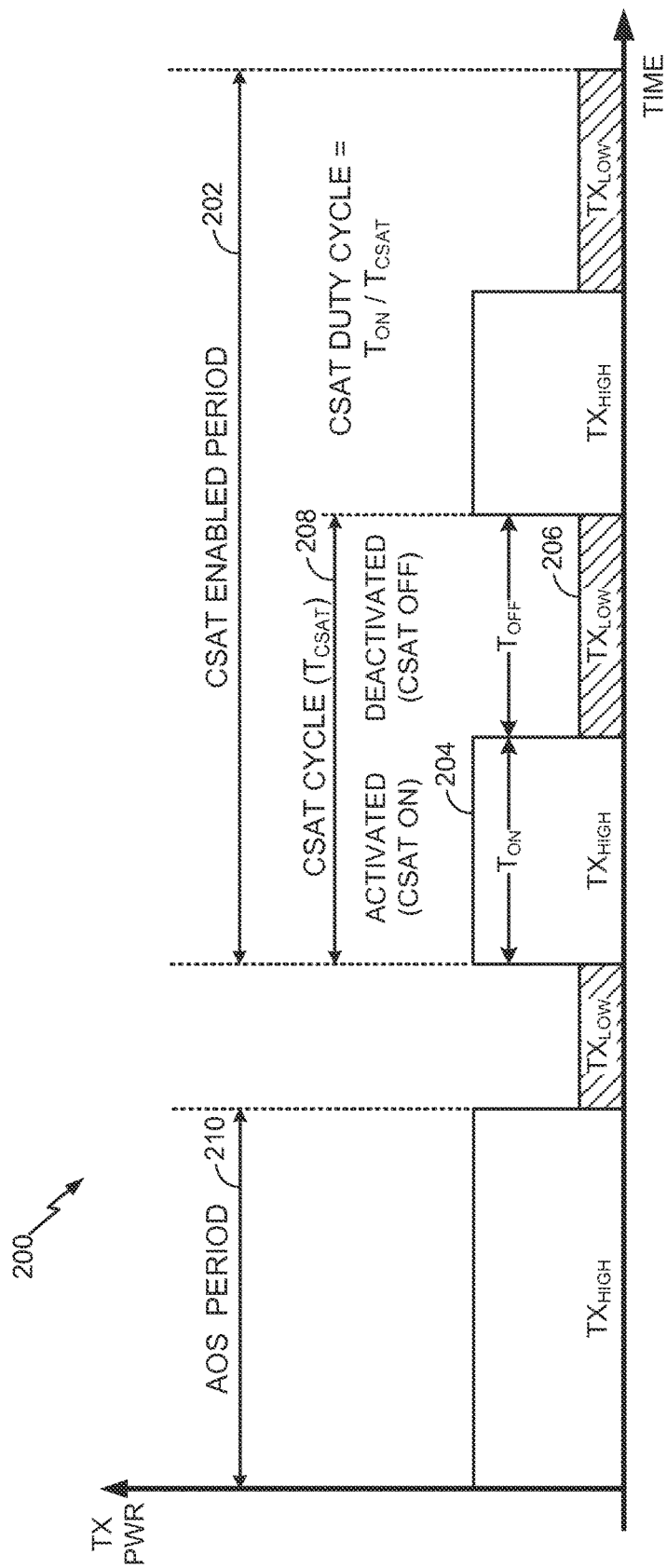
FIG. 2 illustrates certain aspects of an example long-term Time Division Multiplexed (TDM) communication scheme referred to herein as Carrier Sense Adaptive Transmission (CSAT).

FIG. 2 illustrates certain aspects of an example long-term Time Division Multiplexed (TDM) communication scheme referred to herein as Carrier Sense Adaptive Transmission (CSAT) that may be implemented on the medium 132. A CSAT communication scheme may be used to foster co-existence between RAT A communications between the access point 110 and access terminal 120 and other-RAT communications between neighboring devices operating according to RAT B, for example, by cycling operation of RAT A over the medium 132 (e.g., on a corresponding SCell provided by the access point 110 on the unlicensed band) in accordance with a TDM communication pattern 200. A CSAT communication scheme as provided herein may offer several advantages for mixed-RAT co-existence environments.

As shown, during a CSAT enabled period 202, operation of RAT A may be cycled over time between activated (CSAT ON) periods 204 and deactivated (CSAT OFF) periods 206. A given activated period 204/deactivated period 206 pair may constitute a CSAT cycle ($T_{CSAT}$) 208. During a period of time $T_{ON}$ associated with each activated period 204, RAT A transmission on the medium 132 may proceed at a normal, relatively high transmission power. During a period of time $T_{OFF}$ associated with each deactivated period 206, however, RAT A transmission on the medium 132 is reduced or even fully disabled to yield the medium 132 to neighboring devices operating according to RAT B.

Each of the associated CSAT parameters, including, for example, a duty cycle (i.e., $T_{ON}/T_{CSAT}$) and the respective transmission powers during activated periods 204 and deactivated periods 206, may be adapted based on the current signaling conditions on the medium 132 to dynamically optimize the CSAT communication scheme. For example, the RAT B transceiver 142 configured to operate in accordance with RAT B (e.g., Wi-Fi) may be further configured to monitor the medium 132 for RAT B signaling, which may interfere with or be interfered with by RAT A communications over the medium 132. The medium utilization analyzer 144 may be configured to determine a utilization metric associated with utilization of the medium 132 by the RAT B signaling. Based on the utilization metric, the associated parameters may be set and the RAT A transceiver 140 configured to operate in accordance with RAT A (e.g., LTE) may be further configured to cycle between activated periods 204 of communication and deactivated periods 206 of communication over the medium 132 in accordance therewith. As an example, if the utilization metric is high (e.g., above a threshold), one or more of the parameters may be adjusted such that usage of the medium 132 by the RAT A transceiver 140 is reduced (e.g., via a decrease in the duty cycle or transmission power). Conversely, if the utilization metric is low (e.g., below a threshold), one or more of the parameters may be adjusted such that usage of the medium 132 by the RAT A transceiver 140 is increased (e.g., via an increase in the duty cycle or transmission power).

Returning to FIG. 2, the AOS controller 146 may be configured to periodically disable the cycling between activated periods 204 and deactivated periods 206 to provide an AOS period 210 of activated communication over the medium 132 for the RAT A transceiver 140. The AOS period 210 may help to facilitate various measurements by neighboring devices, including both intra-frequency measurements and inter-frequency measurements. For example, the access terminal 120 or similar neighboring access terminals may perform various Radio Resource Management (RRM) measurements (e.g., Reference Signal Received Power (RSRP) or Reference Signal Received Quality (RSRQ) measurements) during the AOS period 210. As another example, neighboring access points may perform various Network Listen (NL) measurements during the AOS period 210. Although these measurements may also be performed during a given activated period 204, the duration of each activated period 204 may be too short for certain measurements to be performed effectively or efficiently. Measurements that span the deactivated period 206 may be ineffective and corrupt channel selection as well as other measurement-based procedures, including Physical Cell Identifier (PCI) collision detection, mobility, tracking loop procedures, etc., thereby detrimentally affecting proper operation of the system.

In general, each AOS period 210 may be longer than an individual activated period 204, thereby providing a supplemental opportunity for measurements. For example, each AOS period may be on the order of a few seconds (e.g., 1-3 seconds, or generally longer than about 1 second). The AOS periods 210 may also be provided periodically, on a recurring basis that balances, for example, the need for the measurement opportunities weighted against the need for stable co-existence between RATs. In this regard, the periodicity may be set, for example, on the order of one AOS period every few minutes (e.g., 1-3 minutes, or generally more frequent than about once every 1 minute), which has been found to adequately balance the competing needs of LTE and Wi-Fi systems, for example, in at least certain example operating environments.

In some scenarios, however, the AOS controller 146 may be further configured to modify the duration of a particular AOS period 210 to provide a longer measurement opportunity for more time-consuming measurements such as cell detection. While an extended AOS period may provide more interference to other-RAT operation on the medium 132, the additional interference may be mitigated by providing them less frequently than other AOS periods. For example, every N number of AOS periods 210 may be an extended AOS (E-AOS) period, with N being on the order of several (e.g., about 10) iterations and the E-AOS period extending for a duration commensurate with a targeted type of measurement (e.g., on the order of about 4 seconds to facilitate a full scan for cell detection). As another example, a timer may be used to extend a given AOS period 210 (e.g., providing an E-AOS period every 10 minutes).

Figure 3:
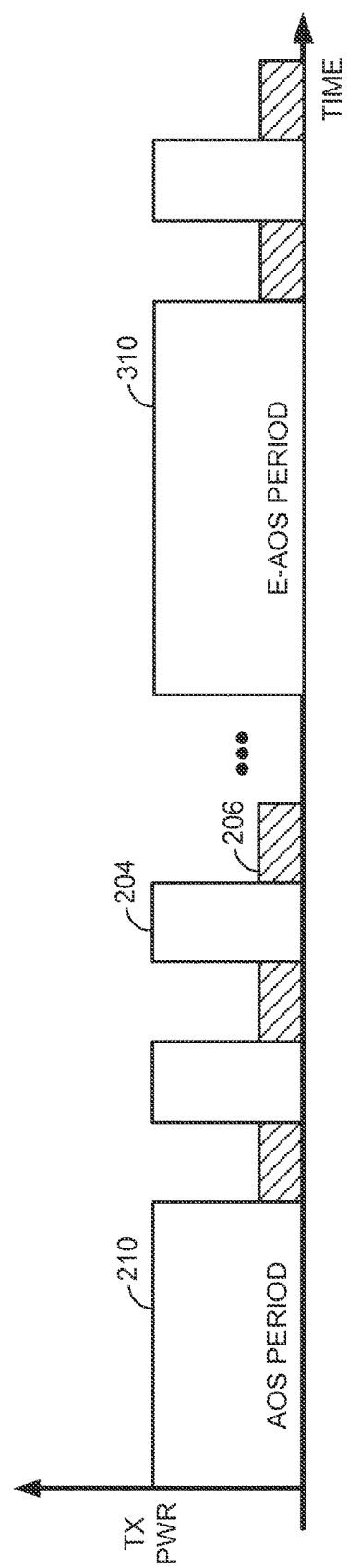
FIG. 3 illustrates an example of a CSAT communication scheme with Always-On-State (AOS).

FIG. 3 illustrates another example of a CSAT communication scheme with AOS that may be implemented on the medium 132. In this example, an E-AOS period 310 is provided (e.g., by the AOS controller 146) in addition to a (normal) AOS period 210. The E-AOS period 310 may be used for measurements that may be more time-consuming but less latency sensitive, for example, while the (normal) AOS period 210 may be used for other measurements that may be completed in a shorter amount of time but may need to be performed more frequently.

Turning to the temporal location of individual AOS periods (including AOS periods 210 and/or E-AOS periods 310), it may be advantageous to coordinate AOS period scheduling for the access point 110 with a plurality of small cell access points (e.g., in a Self-Organizing Network (SON) or otherwise belonging to the same operator). This may help facilitate, for example, certain inter-frequency measurements where the access terminal 120 detects or monitors neighboring cells. Moreover, by coordinating serving cell and neighboring cell AOS period scheduling, various intra-frequency and inter-frequency measurements may be performed in accordance with a common schedule, thereby simplifying configuration of the access terminal 120.

Figure 4:
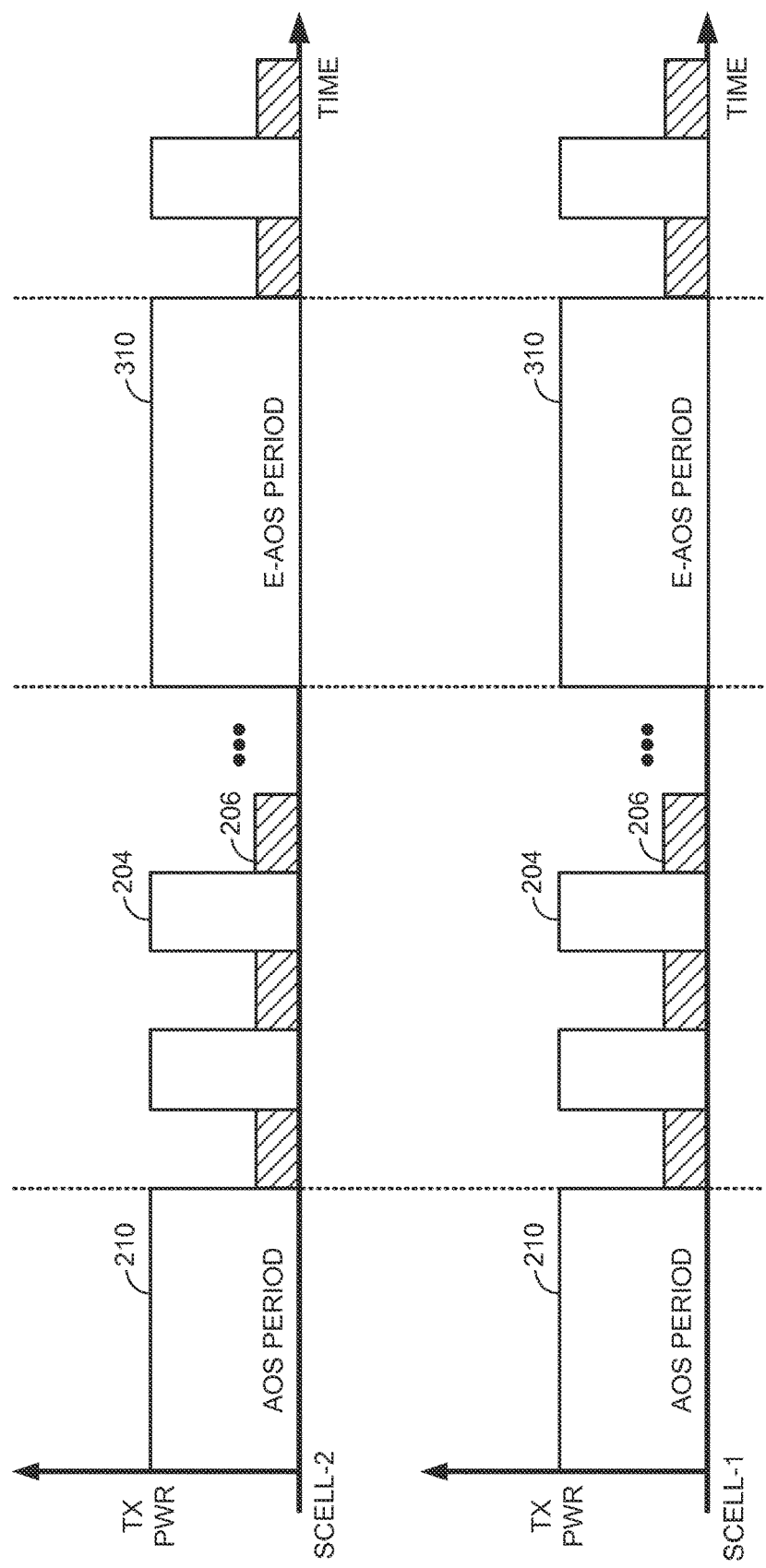
FIG. 4 illustrates another example of a CSAT communication scheme with AOS.

FIG. 4 illustrates another example of a CSAT communication scheme with AOS that may be implemented on the medium 132. In this example, AOS period scheduling is coordinated among different neighboring cells, illustrated as SCell-1 and SCell-2, which may correspond to different small cell access points (e.g., the access point 110 and a neighboring access point), or in some cases, different SCells provided by the same access point. As shown, the two neighboring SCells may be coordinated so as to contemporaneously schedule their AOS periods (including AOS periods 210 and/or E-AOS periods 310). The coordination may be achieved via direct signaling (e.g., over a backhaul or air interface) or via an intermediary entity, such as a central controller or SON entity. The coordination may include, for example, one or more scheduling messages with an indication of AOS periodicity, an indication of AOS duration, an indication of any E-AOS durations, etc., or may be composed of a series of discrete triggering messages indicative of an upcoming AOS on/off boundary.

The access terminal 120, as part of its association with the access point 110 operating in accordance with a CSAT communication scheme with AOS, may be configured to perform radio resource measurements (e.g., RSRP or RSRQ) in a variety of ways. Several examples are discussed in detail below.

Figure 5:
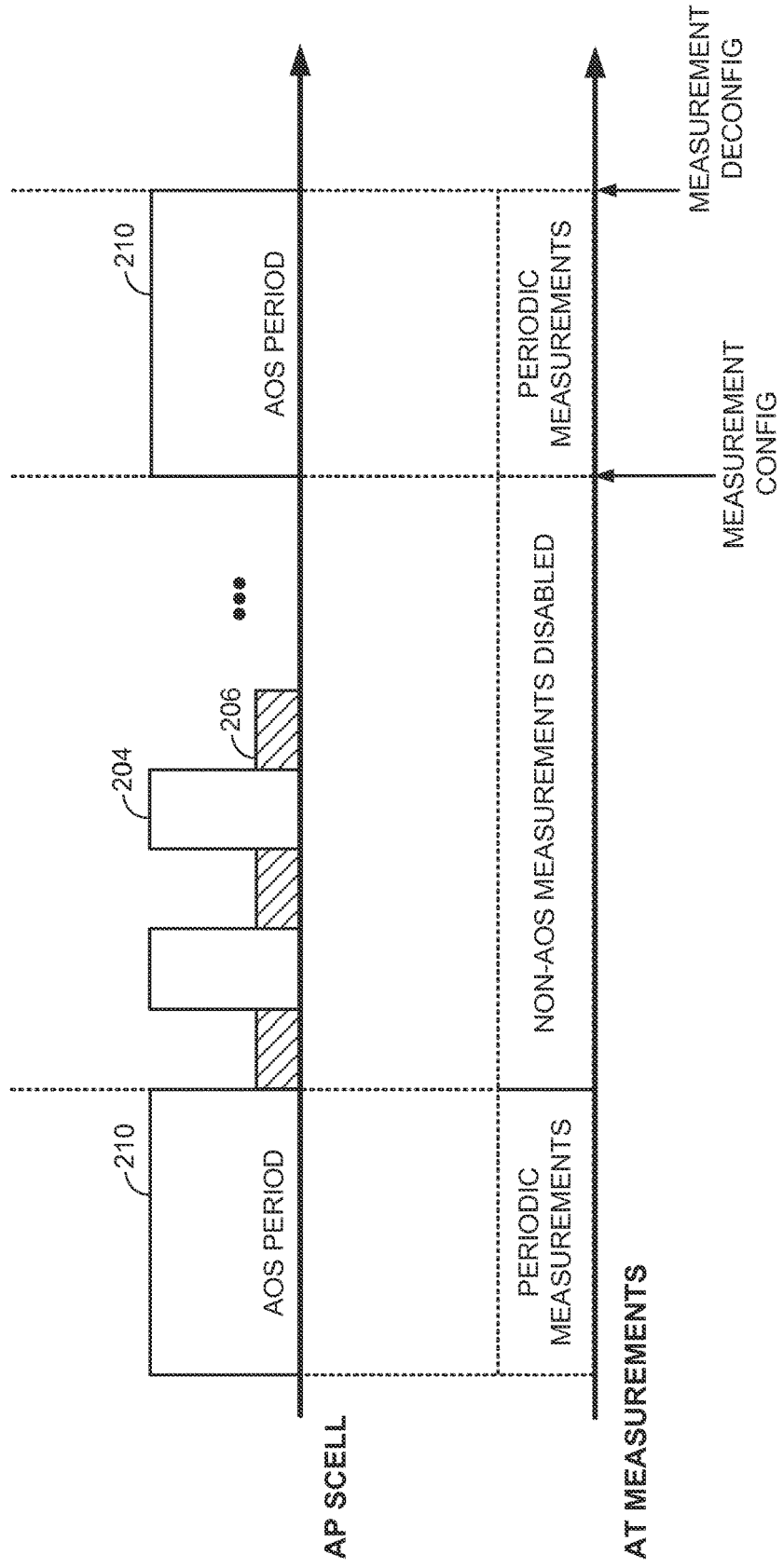
FIG. 5 illustrates another example of a CSAT communication scheme with AOS.

FIG. 5 illustrates another example of a CSAT communication scheme with AOS that may be implemented on the medium 132. In this example, the access terminal 120 is configured by the access point 110 (e.g., via the RAT A transceiver 140) to perform radio resource measurements during the AOS period 210. As shown, for each AOS period 210, the access point 110 may configure the access terminal 120 with a measurement object establishing a periodic measurement mode and corresponding reporting interval for the upcoming AOS period 210. Although shown as substantially commensurate with the beginning of each AOS period 210, it will be appreciated that the configuring may be performed ahead of time, in anticipation of the AOS period 210, so that the access terminal 120 will be ready at the start of the AOS period 210. Similarly, the access terminal 120 may be further configured to disable the periodic measurements outside of the AOS period 210 during the TDM pattern cycling, at or in anticipation of CSAT being turned back on.

In this example, the periodic measurement mode allows the access point 110 to control when the access terminal 120 performs measurements and helps ensure that they take place during the AOS period 210. The corresponding reporting interval ensures that the measurements are reported back to the access point 110 for use in the various AP-side operations described above (e.g., channel selection, radio resource and power management, etc.). As an example, in LTE, the measurement object may be sent via a measConfig message of the type described in 3GPP TS 36.331, entitled "Evolved Universal Terrestrial Radio Access (E-UTRA); Radio Resource Control (RRC)," which is publicly available. The reporting interval may be sent via a corresponding reportConfig message of the type defined in the same document. The reporting interval may be selected based on the AOS period duration as well as any latency requirements associated with the type of measurement being reported (e.g., intra-frequency measurements may be established with a ReportInterval=ms120 while inter-frequency measurements may be established with a longer ReportInterval=ms240).

In addition to periodic measurements during the AOS period 210, non-AOS period measurements may also be permitted in certain circumstances with further configuring of the access terminal 120. Performing non-AOS period measurements helps ensure that a detected SCell will remain in a corresponding cell database maintained by the access terminal 120, and will not be dropped before the next AOS period 210 simply because no recent measurement information is available. Even though some of these measurements may fall on a deactivated period 206 of the TDM pattern 200 and therefore be unreliable, others will correspond to an activated period 204 and be sufficient to keep the SCell from being dropped (which may otherwise occur, for example, if no measurements are performed for 1 minute in between AOS periods 210). Further configuring of the access terminal 120 may be necessary, however, to address other problems that may arise, as discussed in more detail below.

Figure 6:
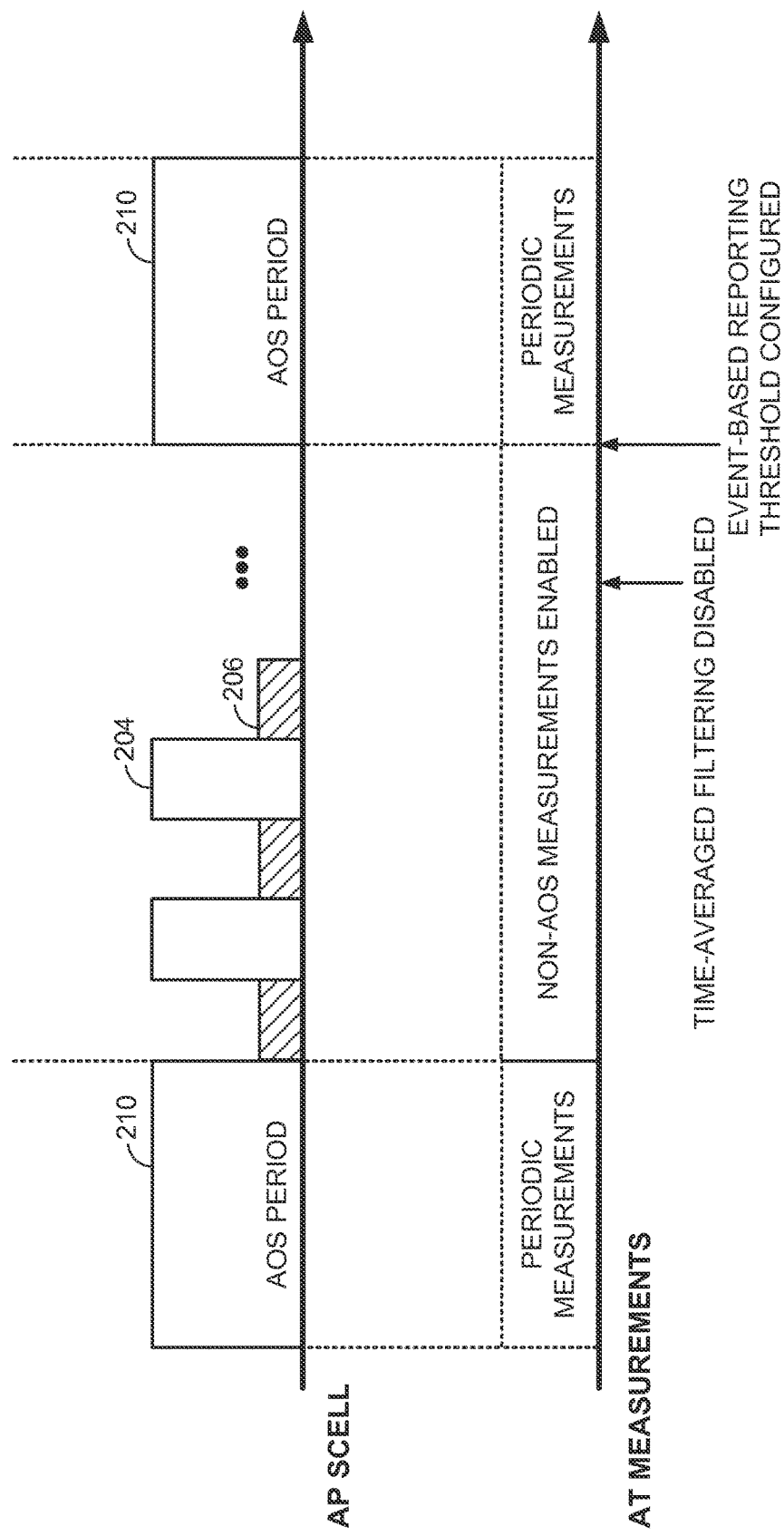
FIG. 6 illustrates another example of a CSAT communication scheme with AOS.

FIG. 6 illustrates another example of a CSAT communication scheme with AOS that may be implemented on the medium 132. In this example, the access terminal 120 is further configured by the access point 110 (e.g., via the RAT A transceiver 140) to perform radio resource measurements during non-AOS periods. As shown, the access terminal 120 may be configured to enable radio resource measurements (e.g., RSRP or RSRQ) outside of the AOS period 210 (i.e., during the TDM pattern cycling), facilitated by disabling certain time-averaged filtering (e.g., layer 3 filtering) of the radio resource measurements, which access terminals typically perform for measurement fidelity but which may be corrupted by the disabled periods 206 of the TDM pattern 200 in CSAT. Disabling this type of filtering helps to ensure that any accurate measurements performed during an activated period 204 (as well during the AOS period 210) are not corrupted by averaging with other distorted or noisy measurements performed during a disabled period 206. The disabling of filtering at the access terminal 120 may accordingly be used to preserve the integrity of both AOS and non-AOS period measurements. Other filtering may be performed on the backend by the access point 110 to compensate for the lack of filtering by the access terminal 120.

An example of this type of filtering is "layer 3" filtering of the type described in 3GPP TS 36.331, entitled "Evolved Universal Terrestrial Radio Access (E-UTRA); Radio Resource Control (RRC)," which is publicly available. Layer 3 filtering may be disabled, for example, by setting a corresponding filter coefficient to zero (e.g., k=0). Although shown as occurring at a particular time in FIG. 6 for illustration purposes, it will be appreciated that the configuring to disable filtering at the access terminal 120 may be performed at any other appropriate time and still achieve the desired effect.

As is further shown in FIG. 6, in this example, the access terminal 120 may be configured for event-based (or event-triggered) measurement reporting during non-AOS periods. Event-based reporting during non-AOS periods is distinct from the periodic reporting during the AOS period 210 described above in that measurement reports from the access terminal 120 are not provided periodically, but rather, in response to certain triggering events that indicate whether information sufficient to warrant a measurement report has been identified. For example, LTE defines several standardized events (e.g., event A2, A3, A4, etc.) that can be used or modified to achieve such functionality, as described in 3GPP TS 36.331, entitled "Evolved Universal Terrestrial Radio Access (E-UTRA); Radio Resource Control (RRC)," which is publicly available. Different events may be used or modified for different types of measurements.

As an example, the radio resource measurements outside of the AOS period 210 may comprise inter-frequency measurements. In this example, the access terminal 120 may be configured to perform event-based-reporting in accordance with a reporting threshold associated with a signal quality of a neighbor cell (e.g., another SCell provided by the access point 110 itself or by another nearby small cell access point). For LTE, for example, the standardized event A4 defined for LTE mobility may be used for this purpose and its associated threshold set sufficiently high to ensure that the measurement report is from an activated period 204 of the TDM pattern implemented by the neighbor cell.

As another example, the radio resource measurements outside of the AOS period 210 may comprise intra-frequency measurements. In this example, the access terminal 120 may be configured to perform event-based-reporting in accordance with a reporting threshold associated with a signal quality of its serving cell. For LTE, for example, the standardized event A2 defined for LTE mobility may be used for this purpose and its associated threshold set sufficiently high to ensure that the measurement report is from an activated period 204 of the TDM pattern implemented by the serving cell.

Returning to FIG. 1, the SCell manager 148 may be configured to manage a set of one or more SCells provided by the access point 110 on the medium 132, from which the access terminal 120 may receive service in conjunction with a Primary Cell (PCell) (which may operate on a licensed or unlicensed band, depending on whether the deployment is a Supplemental DownLink deployment or a Standalone deployment, respectively). The conventional criteria used to manage (e.g., add or remove) SCells in the serving set of the access terminal 120, however, derive from the same measurements discussed above (e.g., RRM measurements such as RSRP or RSRQ) that are subject to corruption by the cycling of a CSAT communication scheme. Accordingly, various modifications to SCell serving set management procedures are discussed in more detail below to address these issues.

Figure 7:
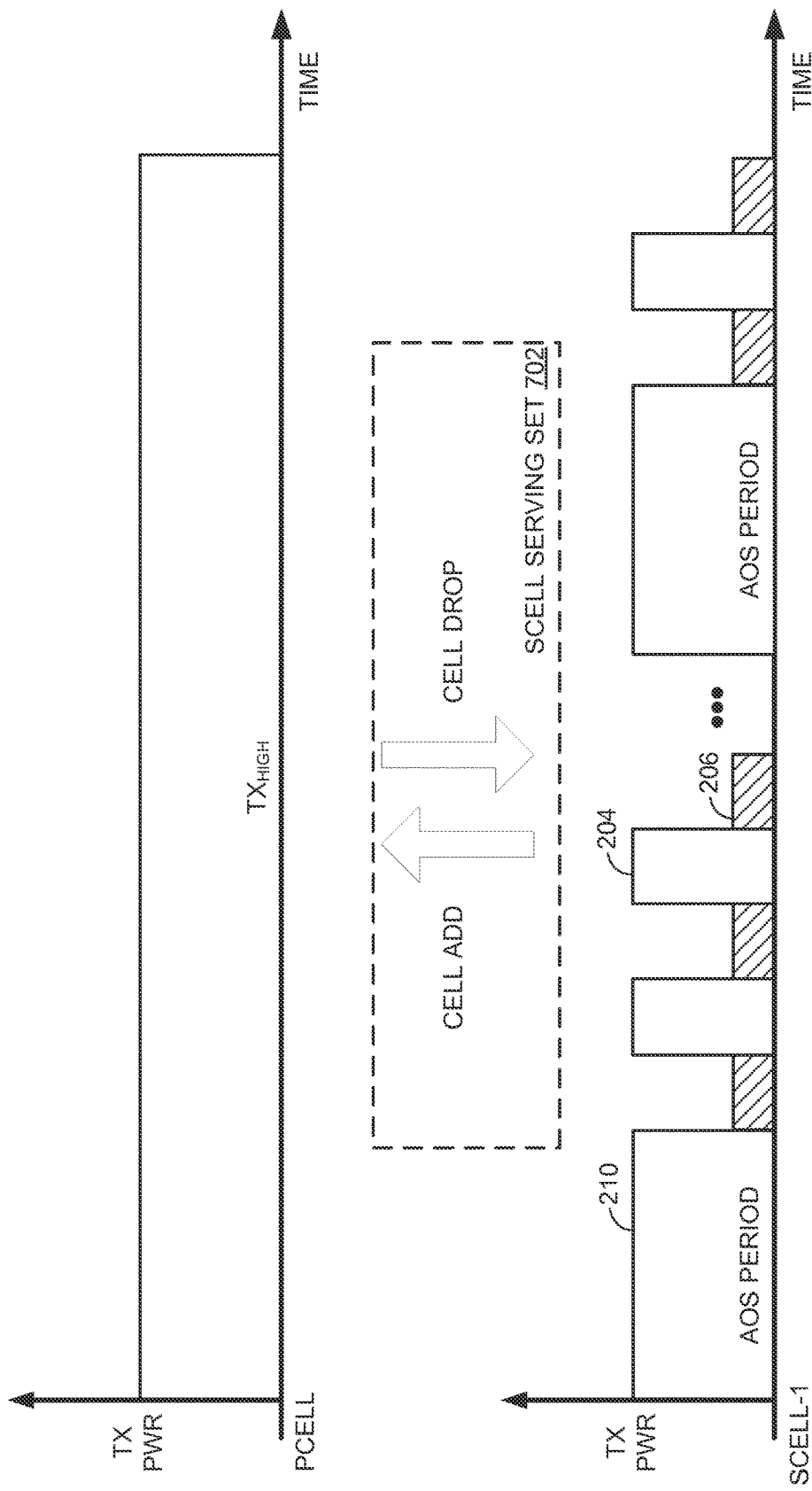
FIG. 7 illustrates another example of a CSAT communication scheme.

FIG. 7 illustrates another example of a CSAT communication scheme that may be implemented on the medium 132. In this example, the access terminal 120 is configured by the access point 110 (e.g., via the RAT A transceiver 140) to add or remove SCells such as the example SCell-1 to/from a serving set 702 of the access terminal 120. For cell removal or addition during the AOS period 210, the ordinary RRM measurements (e.g., RSRP/RSRQ) are available and may be used to evaluate a given cell's performance or candidacy as a serving SCell for the access terminal 120. However, AOS periods 210 may be spaced substantially apart, and relying only on RRM measurements during AOS periods 210 may prevent a high performance SCell from being added to the serving set 702 or keep a poorly functioning SCell in the serving set 702 for a long time, leading to suboptimal if not degraded performance.

Accordingly, during non-AOS periods, the removal decision, for example, may instead be based on a channel quality measurement (e.g., inter-frequency Channel Quality Indicator (CQI)) performed outside of the AOS period 210 during the TDM pattern cycling. A high CQI may generally indicate that an SCell is high-performing and may be maintained in the serving set 702, whereas a low CQI may generally indicate that an SCell is under-performing and may need to be dropped from the serving set 702.

For the addition decision during non-AOS periods, certain measurements from the PCell may be used as a proxy for SCell performance. For example, when the SCell and the PCell are provided by the same small cell access point (e.g., the access point 110), their performance may be generally correlated, rising and falling together, with magnitude differences being largely accounted for by a spectrum differential (or bandwidth offset (BO)) related to path loss differences due to the different characteristics of their respective operating bands (e.g., a PCell operating on a licensed carrier near the 2 GHz range and an SCell operating on an unlicensed carrier near the 5 GHz range will experience different signal dispersion characteristics). Thus, an SCell may be added to the serving set 702 based on a signal quality measurement (e.g., RSRP) of the SCell's corresponding PCell, adjusted by the BO, in comparison to a corresponding threshold. The addition procedure may be further based on an amount of access terminal traffic exceeding a threshold, for example, indicating that the additional carrier is warranted by the access terminal's demand on network resources.

Returning to FIG. 1, as will be discussed in more detail below with reference to FIGS. 8-12, the communication controller 124 of the access terminal 120 may include a measurement controller 154, which may operate in conjunction with the RAT A transceiver 150 to manage operation on the medium 132. The measurement controller 154 may direct the access terminal 120 to refrain from performing various intra-frequency and inter-frequency measurements on the medium 132 during deactivated periods 206, where, as discussed above, measurements may be ineffective and may corrupt channel selection as well as other measurement-based procedures, including Physical Cell Identifier (PCI) collision detection, mobility, tracking loop procedures, etc. By utilizing a measurement controller 154 resident on the access terminal 120 itself to control access terminal measurement behavior, overhead signaling between the access point 110 and the access terminal 120 that may otherwise be required to control such measurements may be reduced.

Figure 8:
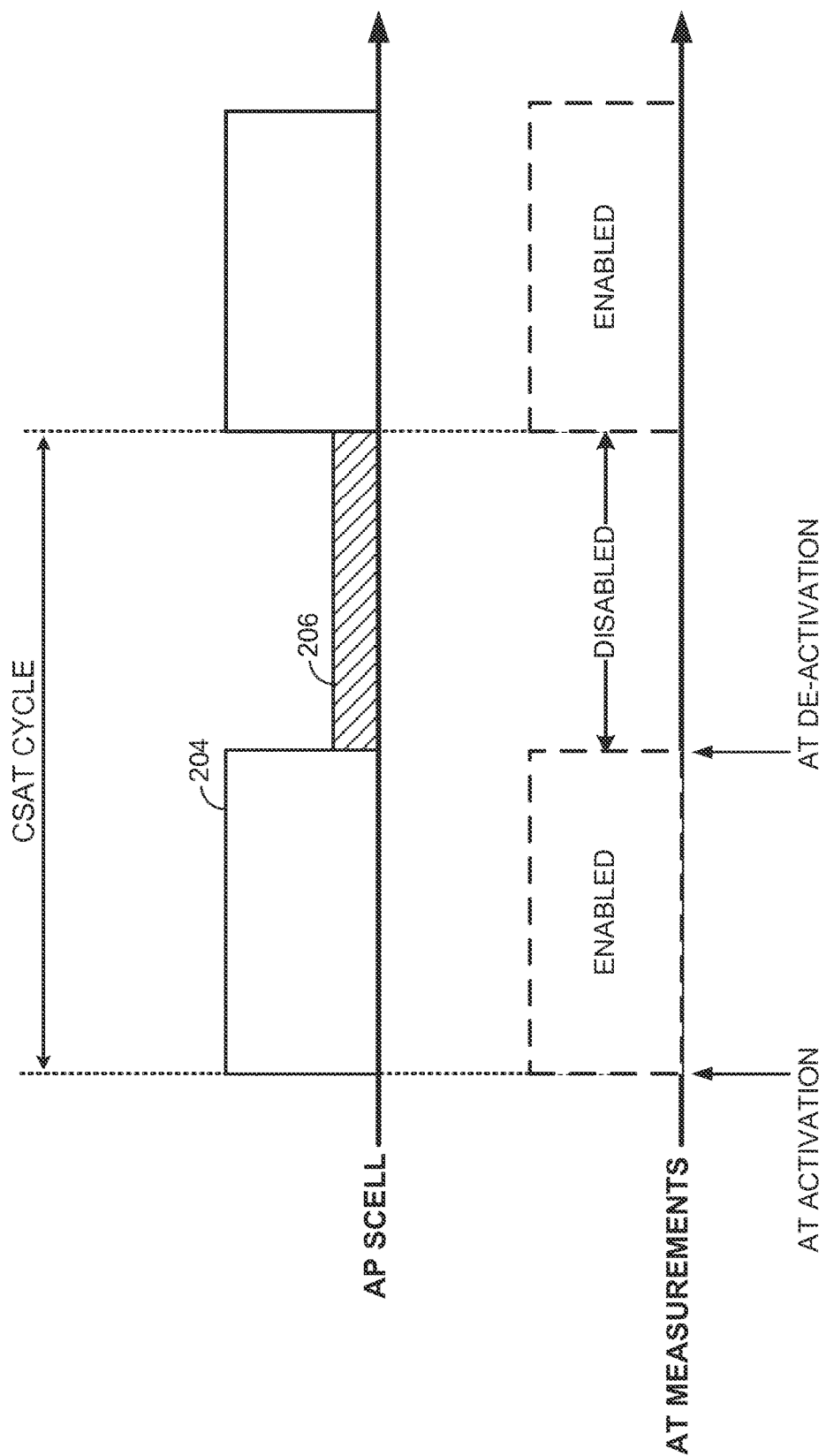
FIG. 8 illustrates an example of a CSAT communication scheme with measurement enabling/disabling.

FIG. 8 illustrates an example of a CSAT communication scheme with measurement enabling/disabling that may be implemented on the medium 132. In this example, the RAT A transceiver 150 may be configured to receive an activation command (e.g., a Medium Access Control (MAC) Control Element (CE)) configuring the access terminal 120 for activated operation over the medium 132 on a particular (first) frequency in accordance with an activated period 204 of the TDM communication pattern 200. As discussed above with reference to FIG. 2, the TDM communication pattern 200 may define activated periods 204 and deactivated periods 206 of communication over the medium 132. The measurement controller 154 may be configured to then enable monitoring of certain signaling on the first frequency (e.g., intra-frequency RRM measurements) and/or another (second) frequency (e.g., inter-frequency RRM measurements) during the activated period 204. The first and second frequencies may correspond to frequencies on an unlicensed band or other shared spectrum. Example signaling that may be monitored includes, but is not limited to, a Primary Synchronization Signal (PSS), a Secondary Synchronization Signal (SSS), a Cell-specific Reference Signal (CRS), etc.

Conversely, the RAT A transceiver 150 may be further configured to receive a deactivation command (e.g., another MAC CE) de-configuring the access terminal 120 from activated operation on the first frequency in accordance with a deactivated period 206 of the TDM communication pattern 200. The measurement controller 154 may be further configured to then disable monitoring by the access terminal 120 of the signaling on the first frequency and/or the second frequency during the deactivated period 206.

As a further enhancement to facilitate intra-frequency and/or inter-frequency measurements across neighboring cells, CSAT cycle timing may be synchronized across different SCells (e.g., within a given operator, and, if feasible, across operators), while still providing individual access points the flexibility to adapt respective parameters within each CSAT cycle (e.g., duty cycle, transmission power, etc.).

Figure 9:
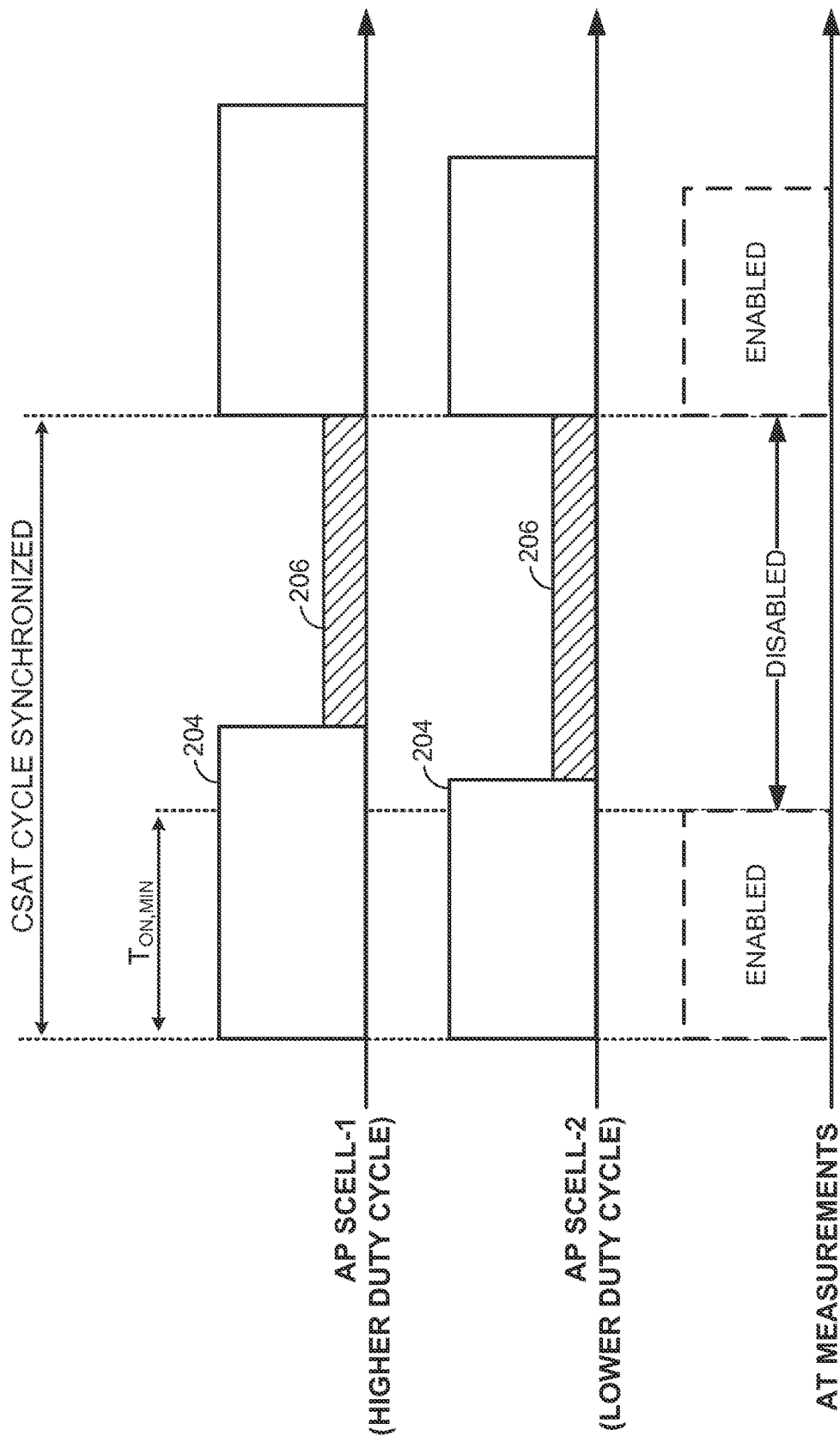
FIG. 9 illustrates an example of a synchronized-cycle CSAT communication scheme with measurement enabling/disabling.

FIG. 9 illustrates an example of a synchronized-cycle CSAT communication scheme with measurement enabling/disabling that may be implemented on the medium 132. In this example, the measurement controller 154 is further configured to direct the access terminal 120 to perform measurements during a minimum duration $T_{ON,min}$ of the activated period 204 specified for the network, which may be common to at least the access points of a given operator. As shown, different cells within the network (illustrated as AP SCell-1 and AP SCell-2, which may correspond to the same access point such as access point 110 or to different access points) may operate at different duty cycles but be constrained by the same minimum duration $T_{ON,min}$. By synchronizing the CSAT cycle timing and restricting measurements to the common minimum duration $T_{ON,min}$, the access terminal 120 can be largely assured that its measurements will be performed when each of the cells it measures are actively transmitting.

In some designs, the access terminal 120 may be configured differently for serving cell and neighboring cell measurements. For example, for its serving cell, it may be advantageous to configure the access terminal 120 as in the design of FIG. 8, such that the measurements are enabled during full activated periods 204, since the access terminal 120 knows more precisely when the serving cell is activated (e.g., via the corresponding activation/deactivation commands from the access point 110 providing the serving cell). Meanwhile, for neighboring cells, it may be advantageous to configure the access terminal 120 as in the design of FIG. 9, such that the measurements are restricted to the minimum duration $T_{ON,min}$, since the access terminal 120 does not know the full activated periods 204 of neighboring cells.

Figure 10:
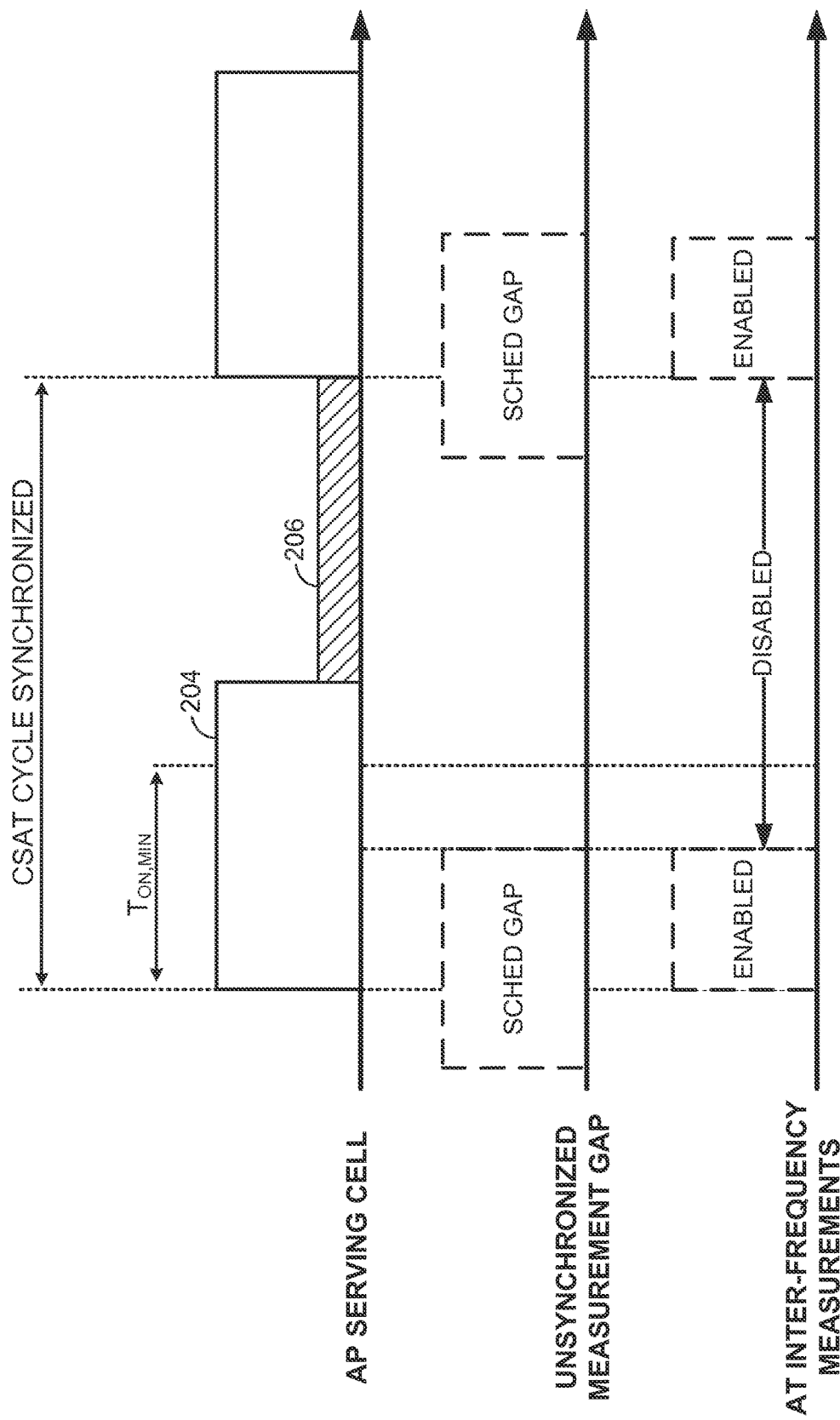
FIG. 10 illustrates another example of a synchronized-cycle CSAT communication scheme with measurement enabling/disabling.

FIG. 10 illustrates another example of a synchronized-cycle CSAT communication scheme with measurement enabling/disabling that may be implemented on the medium 132. In this example, measurement gaps are assigned by the network (e.g., via a serving cell) to the access terminal 120 (among other access terminals) so that the access terminal 120 can tune from a source carrier frequency to a target carrier frequency to perform inter-frequency measurements. Ordinarily, the measurement gaps will not be synchronized with operation according to a CSAT communication scheme, which may lead to similar measurement fidelity issues as discussed above. Accordingly, as is further shown, for inter-frequency measurements the measurement controller 154 may be further configured to direct the access terminal 120 to only measure when activated and when the measurement gap overlaps with the minimum duration $T_{ON,min}$.

Figure 11:
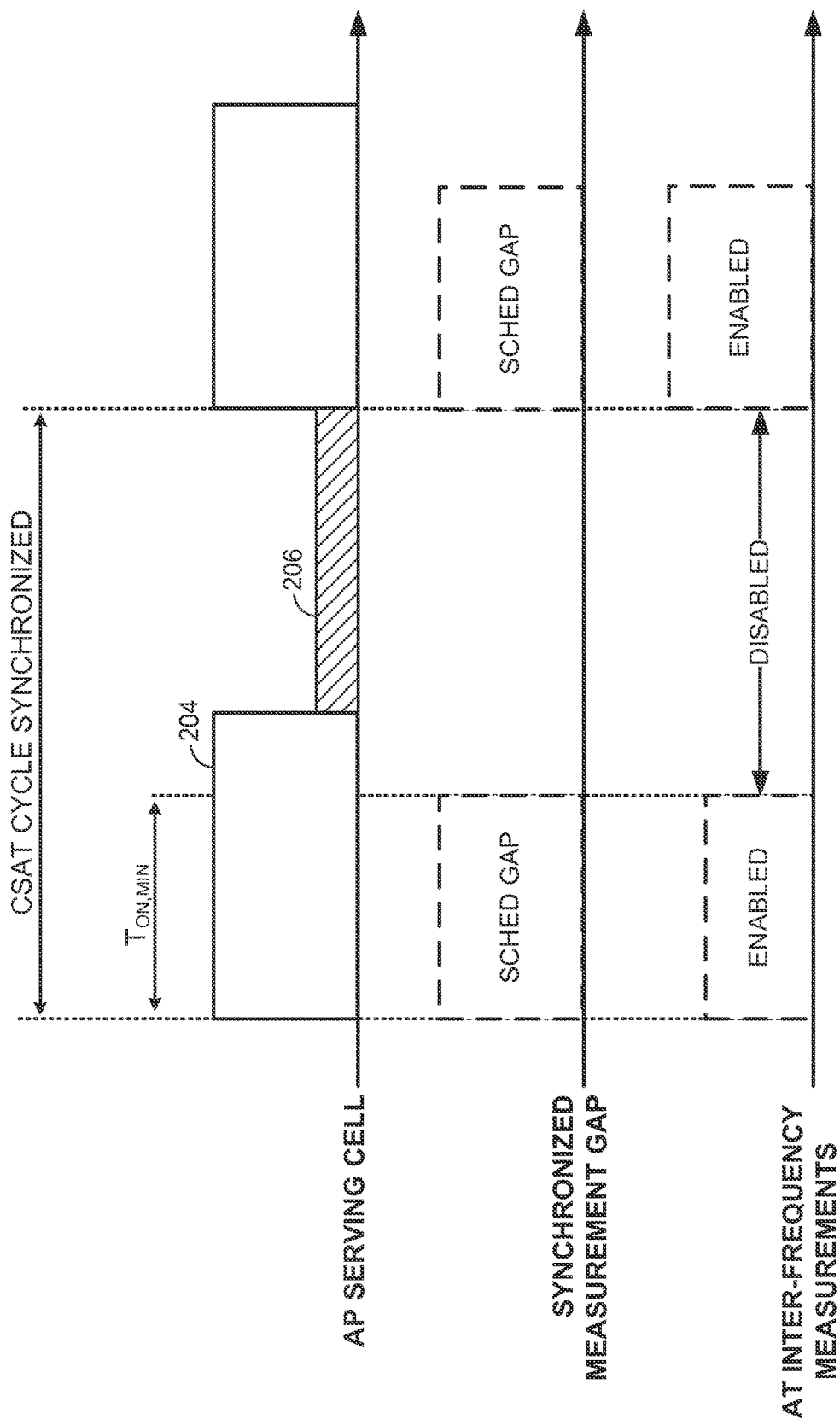
FIG. 11 illustrates another example of a synchronized-cycle CSAT communication scheme with measurement enabling/disabling.

FIG. 11 illustrates another example of a synchronized-cycle CSAT communication scheme with measurement enabling/disabling that may be implemented on the medium 132. In this example, measurement gaps are again assigned by the network (e.g., via a serving cell) to facilitate inter-frequency measurements. In addition, however, the measurement gaps are also synchronized with operation according to a CSAT communication scheme to better facilitate inter-frequency measurements.

Figure 12:
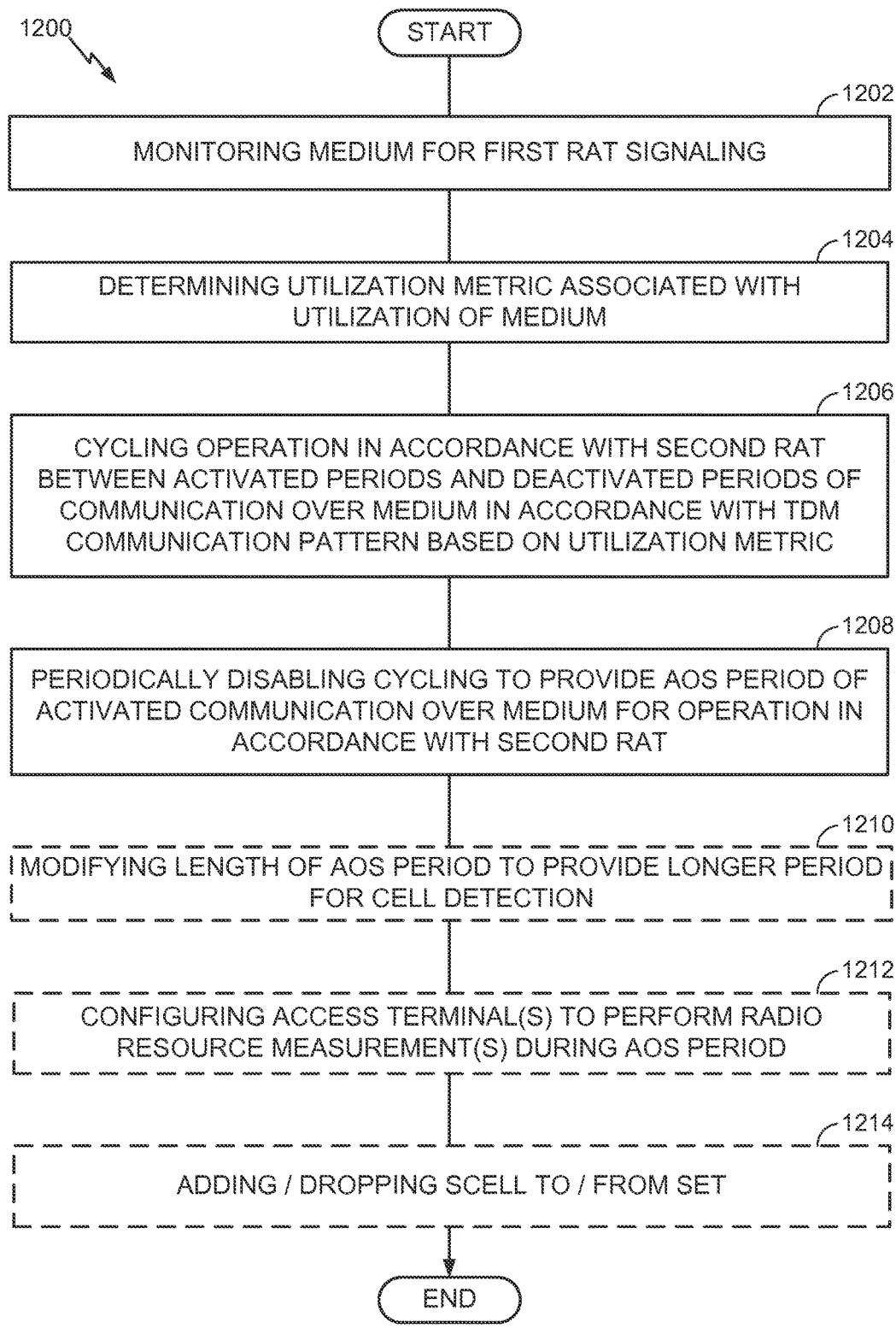
FIG. 12 is a flow diagram illustrating an example method of managing operation on a communication medium shared between Radio Access Terminals (RATs).

FIG. 12 is a flow diagram illustrating an example method of managing operation on a communication medium (e.g., the medium 132) shared between RATs in accordance with the techniques described above. The method 1200 may be performed, for example, by an access point (e.g., the access point 110 illustrated in FIG. 1).

As shown, the access point may monitor (block 1202) the medium for first RAT signaling in accordance with a first RAT (e.g., Wi-Fi). The monitoring may be performed, for example, by a transceiver such as the RAT B transceiver 142 or the like. The access point may determine (block 1204) a utilization metric associated with utilization of the medium by the first RAT signaling. The determining may be performed, for example, by a medium utilization analyzer such as the medium utilization analyzer 144 or the like. The access point may cycle (block 1206) operation in accordance with a second RAT (e.g., LTE) between activated periods (e.g., the activated periods 204) and deactivated periods (e.g., the deactivated periods 206) of communication over the medium in accordance with a TDM communication pattern (e.g., the TDM pattern 200) based on the utilization metric. The access point may periodically disable (block 1208) the cycling to provide an AOS period (e.g., the AOS period 210) of activated communication over the medium for operation in accordance with the second RAT, with the AOS period being longer than an individual activated period of the TDM communication pattern. As an example, the AOS period may comprise a duration that is longer than about one second and a periodicity that is more frequent than about once every one minute.

As discussed in more detail above, in some designs, the access point may also modify (optional block 1210) the length of the AOS period to provide a longer period for cell detection. In some designs, the access point may also configure (optional block 1212) one or more access terminals such as the access terminal 120 to perform one or more radio resource measurements during the AOS period. In some designs, the cycling may be performed on a set of one or more SCells, and the access point may remove (optional block 1214) an SCell from the set based on a channel quality measurement performed outside of the AOS period during the cycling. In some designs, the cycling may be performed on a set of one or more SCells associated with a first frequency band and operating in conjunction with a PCell associated with a second frequency band, and the access point may add (optional block 1214) an SCell to the set based on a signal quality measurement of the PCell.

Figure 13:
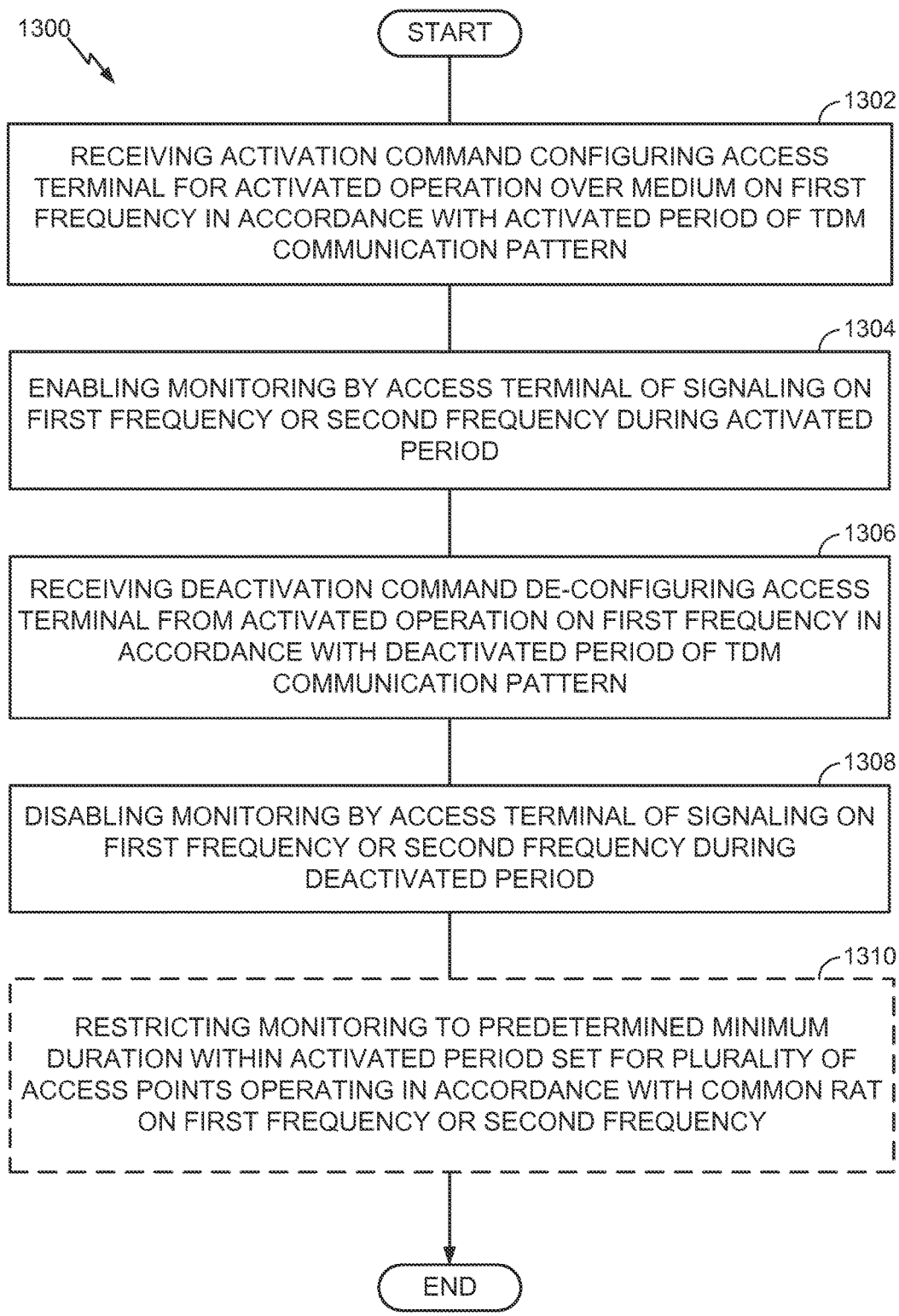
FIG. 13 is another flow diagram illustrating an example method of managing operation on a communication medium shared between RATs.

FIG. 13 is another flow diagram illustrating an example method of managing operation on a communication medium (e.g., the medium 132) shared between RATs in accordance with the techniques described above. The method 1300 may be performed, for example, by an access terminal (e.g., the access terminal 120 illustrated in FIG. 1).

As shown, the access terminal may receive (block 1302) an activation command configuring the access terminal for activated operation over the medium on a first unlicensed frequency in accordance with an activated period (e.g., the activated period 204) of a TDM communication pattern (e.g., the TDM pattern 200) defining activated periods (e.g., activated periods 204) and deactivated periods (e.g., deactivated periods 206) of communication over the medium. The receiving may be performed, for example, by a transceiver such as the RAT A transceiver 150 or the like. The access terminal may enable (block 1304) monitoring by the access terminal of signaling on the first unlicensed frequency and/or a second unlicensed frequency during the activated period. The enabling may be performed, for example, by a measurement controller such as the measurement controller 154 or the like. The access terminal may receive (block 1306) a deactivation command de-configuring the access terminal from activated operation on the first unlicensed frequency in accordance with a deactivated period of the TDM communication pattern. The receiving may be performed, for example, by a transceiver such as the RAT A transceiver 150 or the like. The access terminal may disable (block 1308) monitoring by the access terminal of the signaling on the first unlicensed frequency and/or the second unlicensed frequency during the deactivated period. The disabling may be performed, for example, by a measurement controller such as the measurement controller 154 or the like.

As discussed in more detail above, in some designs, the access terminal may also restrict (optional block 1310) the monitoring to a predetermined minimum duration within the activated period that is set for a plurality of access points operating in accordance with a common RAT on the first unlicensed frequency and/or the second unlicensed frequency.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 14:
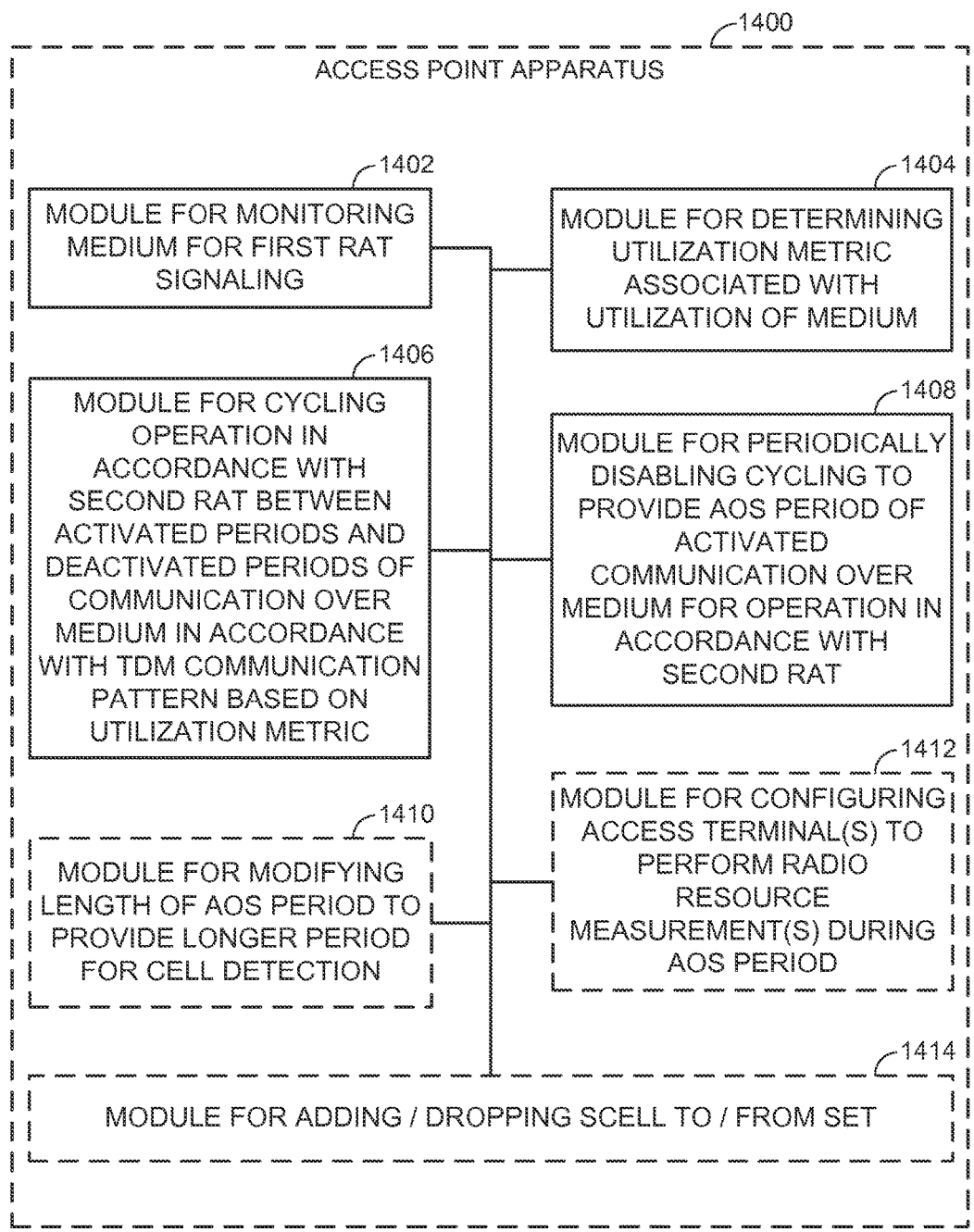
FIG. 14 illustrates an example access point apparatus represented as a series of interrelated functional modules.
Figure 15:
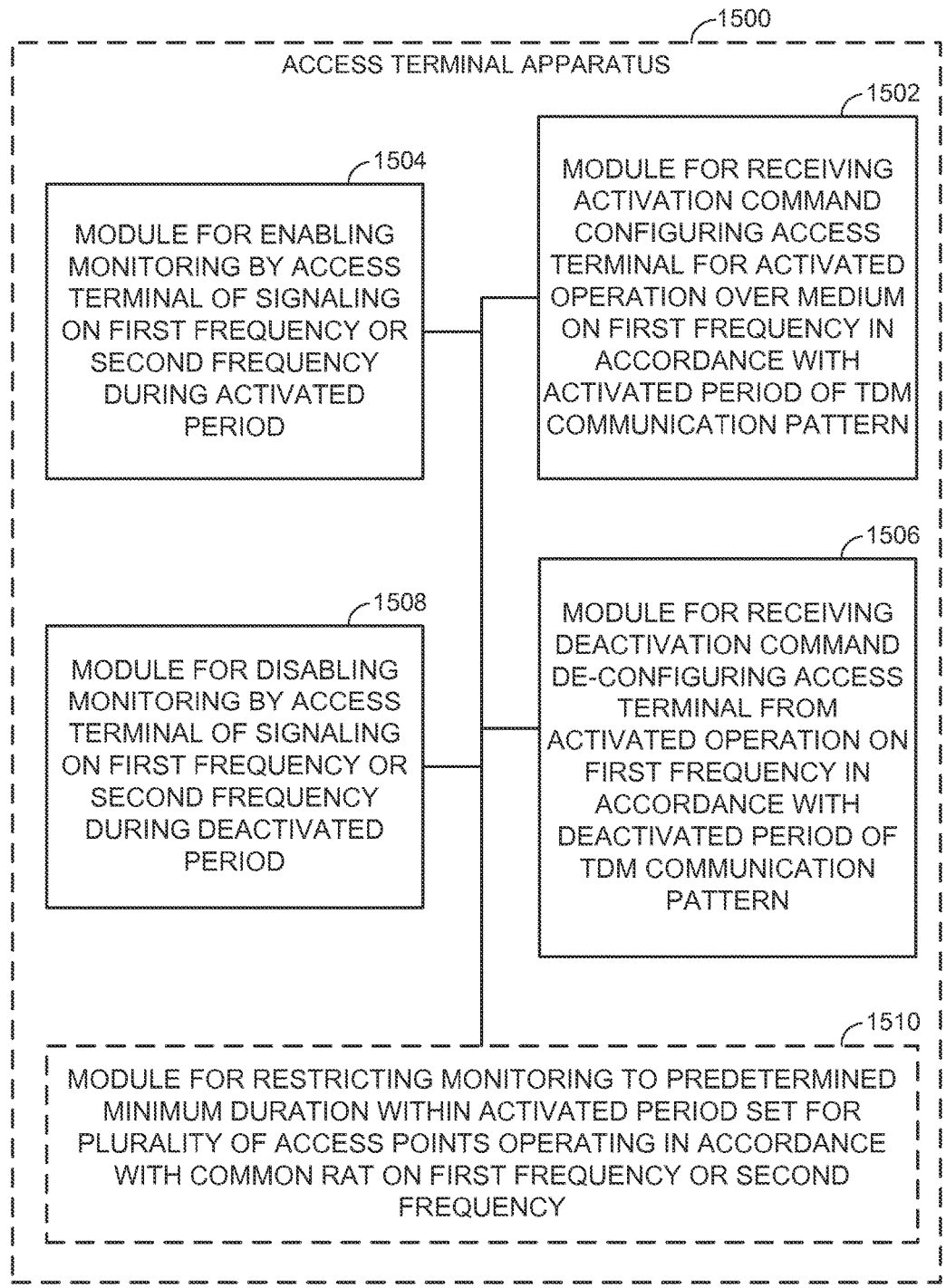
FIG. 15 illustrates an example access terminal apparatus represented as a series of interrelated functional modules.

FIGS. 14-15 provide alternative illustrations of apparatuses for implementing the access point 110 and the access terminal 120 represented as a series of interrelated functional modules.

FIG. 14 illustrates an example access point apparatus 1400 represented as a series of interrelated functional modules. A module for monitoring 1402 may correspond at least in some aspects to, for example, a communication device or a component thereof as discussed herein (e.g., the communication device 112 or the like). A module for determining 1404 may correspond at least in some aspects to, for example, a communication controller or a component thereof as discussed herein (e.g., the communication controller 114 or the like). A module for cycling 1406 may correspond at least in some aspects to, for example, a communication device or a component thereof as discussed herein (e.g., the communication device 112 or the like). A module for periodically disabling 1408 may correspond at least in some aspects to, for example, a communication controller or a component thereof as discussed herein (e.g., the communication controller 114 or the like). An optional module for modifying 1410 may correspond at least in some aspects to, for example, a communication controller or a component thereof as discussed herein (e.g., the communication controller 114 or the like). An optional module for configuring 1412 may correspond at least in some aspects to, for example, a communication device or a component thereof as discussed herein (e.g., the communication device 112 or the like). An optional module for adding/dropping 1414 may correspond at least in some aspects to, for example, a communication controller or a component thereof as discussed herein (e.g., the communication controller 114 or the like).

FIG. 15 illustrates an example access terminal apparatus 1500 represented as a series of interrelated functional modules. A module for receiving 1502 may correspond at least in some aspects to, for example, a communication device or a component thereof as discussed herein (e.g., the communication device 122 or the like). A module for enabling 1504 may correspond at least in some aspects to, for example, a communication controller or a component thereof as discussed herein (e.g., the communication controller 124 or the like). A module for receiving 1506 may correspond at least in some aspects to, for example, a communication device or a component thereof as discussed herein (e.g., the communication device 122 or the like). A module for disabling 1508 may correspond at least in some aspects to, for example, a communication controller or a component thereof as discussed herein (e.g., the communication controller 124 or the like). An optional module for restricting 1510 may correspond at least in some aspects to, for example, a communication controller or a component thereof as discussed herein (e.g., the communication controller 124 or the like).

The functionality of the modules of FIGS. 14-15 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIGS. 14-15, as well as other components and functions described herein, may be implemented using any suitable means. Such means also may be implemented, at least in part, using corresponding structure as taught herein. For example, the components described above in conjunction with the "module for" components of FIGS. 14-15 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for communication management between RATs sharing operating spectrum in an unlicensed band of radio frequencies. As an example, such a computer-readable medium may include instructions for monitoring the medium for first RAT signaling in accordance with a first RAT; instructions for determining a utilization metric associated with utilization of the medium by the first RAT signaling; instructions for cycling operation in accordance with a second RAT between activated periods and deactivated periods of communication over the medium in accordance with a TDM communication pattern based on the utilization metric; and instructions for periodically disabling the cycling to provide an AOS period of activated communication over the medium for operation in accordance with the second RAT, with the AOS period being longer than an individual activated period of the TDM communication pattern. As another example, such a computer-readable medium may include instructions for receiving an activation command configuring an access terminal for activated operation over the medium on a first unlicensed frequency in accordance with an activated period of a TDM communication pattern defining activated periods and deactivated periods of communication over the medium; instructions for enabling monitoring by the access terminal of signaling on the first unlicensed frequency and/or a second unlicensed frequency during the activated period; instructions for receiving a deactivation command de-configuring the access terminal from activated operation on the first unlicensed frequency in accordance with a deactivated period of the TDM communication pattern; and instructions for disabling monitoring by the access terminal of the signaling on the first unlicensed frequency and/or the second unlicensed frequency during the deactivated period.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus for managing operation on a communication medium shared between Radio Access Technologies (RATs), comprising:
   a first transceiver configured to operate in accordance with a first RAT and to monitor the shared communication medium for first RAT signaling;
   a medium utilization analyzer configured to determine a utilization metric associated with utilization of the shared communication medium by the first RAT signaling;
   a second transceiver configured to operate in accordance with a second RAT and to cycle between activated periods and deactivated periods of communication over the shared communication medium in accordance with a Time Division Multiplexing (TDM) communication pattern based on the utilization metric; and
   an Always-On-State (AOS) controller configured to periodically disable the cycling to provide an AOS period of activated communication over the shared communication medium for the second transceiver,
   wherein the AOS period is longer than an individual activated period of the TDM communication pattern, and
   wherein the second transceiver is further configured to configure one or more access terminals to perform one or more radio resource measurements during the AOS period.

2. The apparatus of claim 1, wherein the AOS period comprises a duration that is longer than one second and a periodicity that is more frequent than once every one minute.

3. The apparatus of claim 1, wherein the AOS controller is further configured to modify the length of the AOS period to provide a longer period for cell detection.

4. The apparatus of claim 1, wherein the AOS period is coordinated among a plurality of small cell access points.

5. The apparatus of claim 1, wherein the second transceiver is configured to perform the configuring in anticipation of the AOS period by sending a measurement object to the one or more access terminals to establish a periodic measurement mode and a corresponding reporting interval for the AOS period.

6. The apparatus of claim 1, wherein the second transceiver is further configured to configure the one or more access terminals to disable one or more radio resource measurements outside of the AOS period during the cycling.

7. The apparatus of claim 1, wherein the second transceiver is further configured to:
   configure the one or more access terminals to enable radio resource measurements outside of the AOS period during the cycling; and
   disable time-averaged filtering of the radio resource measurements at the one or more access terminals.

8. The apparatus of claim 7, wherein the second transceiver is further configured to configure the one or more access terminals to perform event-based-reporting of the radio resource measurements outside of the AOS period during the cycling.

9. The apparatus of claim 8, wherein the radio resource measurements outside of the AOS period comprise inter-frequency measurements, and wherein the second transceiver is configured to configure the one or more access terminals to perform event-based-reporting by configuring a reporting threshold associated with a signal quality of a neighbor cell.

10. The apparatus of claim 8, wherein the radio resource measurements outside of the AOS period comprise intra-frequency measurements, and wherein the second transceiver is configured to configure the one or more access terminals to perform event-based-reporting by configuring a reporting threshold associated with a signal quality of a serving cell.

11. The apparatus of claim 1, wherein the second transceiver is configured to perform the cycling on a set of one or more Secondary Cells (SCells), the apparatus further comprising an SCell manager configured to remove an SCell from the set based on a channel quality measurement performed outside of the AOS period during the cycling.

12. The apparatus of claim 11, wherein the SCell manager is configured to remove the SCell based further on the one or more radio resource measurements during the AOS period.

13. The apparatus of claim 1, wherein the second transceiver is configured to perform the cycling on a set of one or more Secondary Cells (SCells) associated with a first frequency band and operating in conjunction with a Primary Cell (PCell) associated with a second frequency band, the apparatus further comprising an SCell manager configured to add an SCell to the set based on a signal quality measurement of the PCell.

14. The apparatus of claim 13, wherein the SCell manager is configured to add the SCell by comparing the signal quality measurement to a threshold adjusted for a path loss difference between the first frequency band and the second frequency band.

15. The apparatus of claim 13, wherein the SCell manager is configured to add the SCell based further on an amount of user traffic exceeding a threshold warranting use of an additional carrier.

16. The apparatus of claim 1, wherein:
the shared communication medium comprises one or more time, frequency, or space resources on an unlicensed radio frequency band;
the first RAT comprises Wi-Fi technology; and
the second RAT comprises Long Term Evolution (LTE) technology.

17. A method of managing operation on a communication medium shared between Radio Access Technologies (RATs), comprising:
monitoring the shared communication medium for first RAT signaling in accordance with a first RAT;
determining a utilization metric associated with utilization of the shared communication medium by the first RAT signaling;
cycling operation in accordance with a second RAT between activated periods and deactivated periods of communication over the shared communication medium in accordance with a Time Division Multiplexing (TDM) communication pattern based on the utilization metric;
periodically disabling the cycling to provide an always-on-state (AOS) period of activated communication over the shared communication medium for operation in accordance with the second RAT, wherein the AOS period is longer than an individual activated period of the TDM communication pattern; and
configuring one or more access terminals to perform one or more radio resource measurements during the AOS period.

18. The method of claim 17, wherein the AOS period comprises a duration that is longer than one second and a periodicity that is more frequent than once every one minute.

19. The method of claim 17, further comprising modifying the length of the AOS period to provide a longer period for cell detection.

20. The method of claim 17, wherein the cycling is performed on a set of one or more Secondary Cells (SCells), the method further comprising removing an SCell from the set based on a channel quality measurement performed outside of the AOS period during the cycling.

21. The method of claim 17, wherein the cycling is performed on a set of one or more Secondary Cells (SCells) associated with a first frequency band and operating in conjunction with a Primary Cell (PCell) associated with a second frequency band, the method further comprising adding an SCell to the set based on a signal quality measurement of the PCell.

* * * * *